United States Patent [19]

Klaassen et al.

[11] 4,427,536

[45] Jan. 24, 1984

[54] PROMOTER FOR THE OXIDATION OF $SO_2$ IN AN FCC PROCESS

[75] Inventors: Alan W. Klaassen, El Cerrito; Richard D. Bezman, Richmond, both of Calif.

[73] Assignee: Chevron Research Company, San Francisco, Calif.

[21] Appl. No.: 407,850

[22] Filed: Aug. 13, 1982

Related U.S. Application Data

[63] Continuation-in-part of Ser. No. 344,915, Feb. 2, 1982, abandoned, which is a continuation-in-part of Ser. No. 296,619, Aug. 27, 1981, abandoned.

[51] Int. Cl.³ .................. B01J 20/02; B01J 23/42; B01J 23/44
[52] U.S. Cl. .................. 208/113; 208/120; 423/244; 502/38; 502/241; 502/262; 502/333; 502/339
[58] Field of Search .............. 208/113, 119, 120, 121, 208/124; 252/411 S, 416; 423/244

[56] References Cited

U.S. PATENT DOCUMENTS

| | | |
|---|---|---|
| 4,153,535 | 5/1979 | Vasalos et al. .................. 208/120 |
| 4,164,465 | 8/1979 | Gladrow .......................... 208/120 |
| 4,252,636 | 2/1981 | Mooi ................................ 208/120 |
| 4,297,244 | 10/1981 | Mooi ............................. 252/455 Z |
| 4,300,997 | 11/1981 | Meguerian et al. ............. 208/120 |
| 4,316,795 | 2/1982 | Mooi ............................... 208/120 |

*Primary Examiner*—Delbert E. Gantz
*Assistant Examiner*—O Chaudhuri
*Attorney, Agent, or Firm*—D. A. Newell; S. R. LaPaglia; J. W. Ambrosius

[57] ABSTRACT

In a process for cracking a sulfur-containing hydrocarbon an improved oxidation promoter for converting $SO_2$ to $SO_3$ comprising an intimate association of palladium and at least one other metal selected from the group comprising platinum, osmium, iridium, rhenium, and rhodium.

10 Claims, 2 Drawing Figures

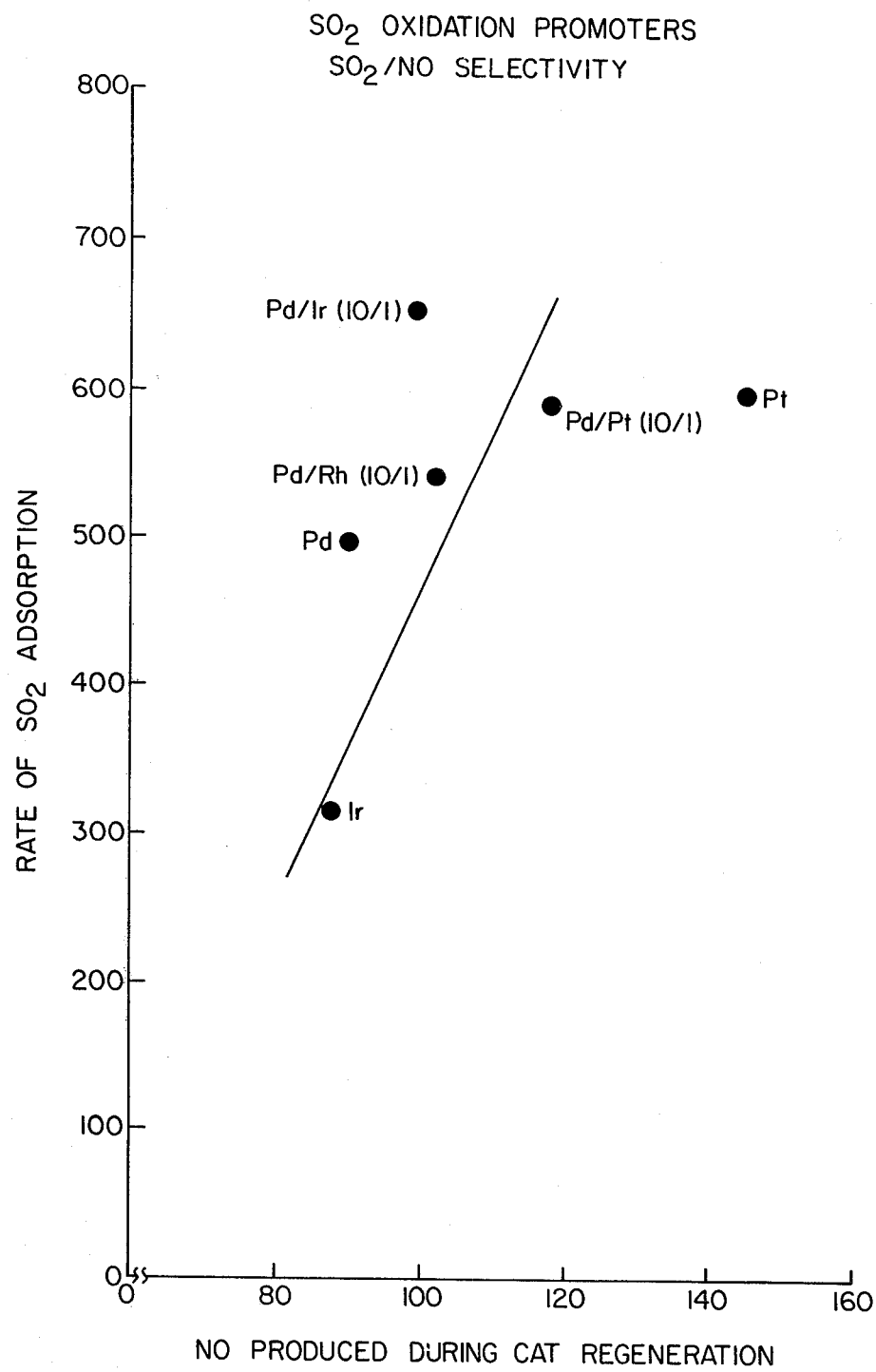
FIG.__1.

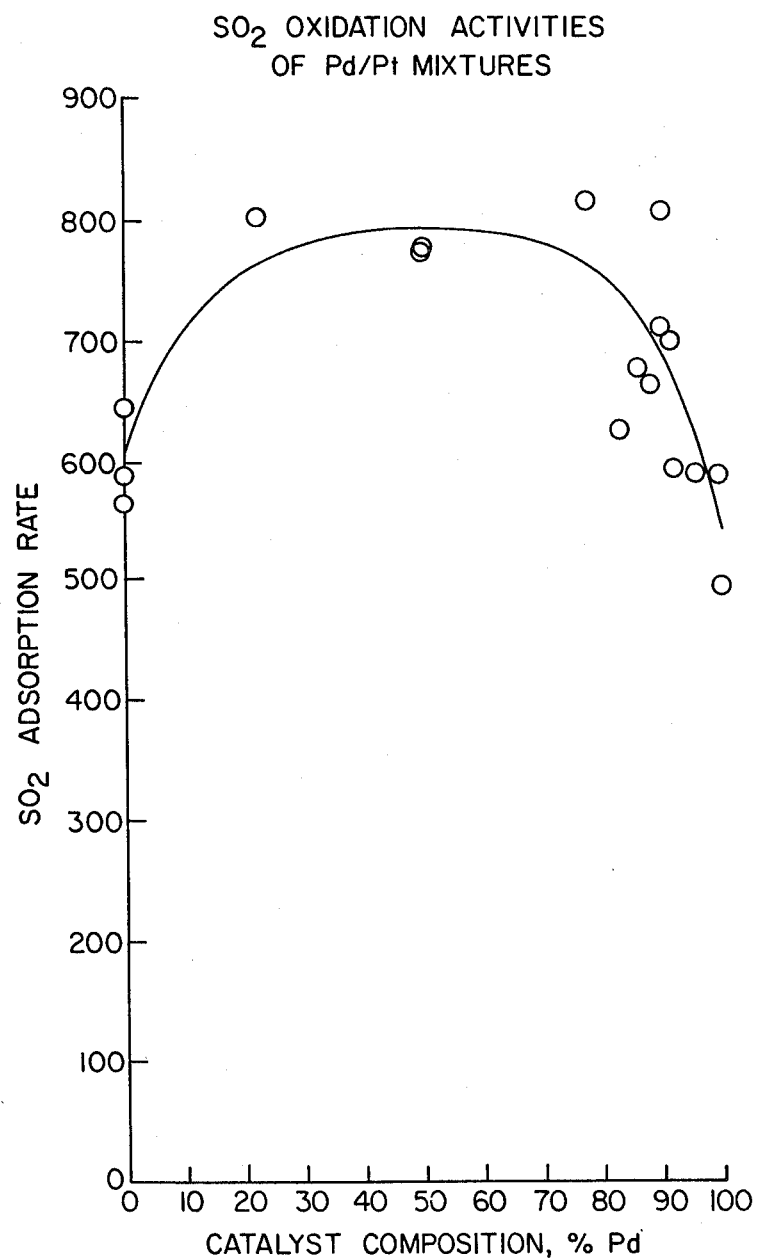
FIG._2.

PROMOTER FOR THE OXIDATION OF SO₂ IN AN FCC PROCESS

CROSS-REFERENCE TO RELATED APPLICATION

This application is a continuation-in-part of copending U.S. patent application Ser. No. 344,915, filed Feb. 2, 1982, now abandoned which is a continuation-in-part of U.S. patent application Ser. No. 296,619, filed Aug. 27, 1981 now abandoned. The contents of U.S. patent application Ser. No. 344,915 are herein incorporated by reference.

BACKGROUND OF THE INVENTION

Fluid catalytic cracking involves the catalytic breakdown of heavy hydrocarbons to lighter fuels and petrochemical stocks. A typical catalytic cracking (FCC) unit has a hydrocarbon cracking zone and a catalyst regeneration zone. A particulate catalyst, generally containing a zeolite, is cycled between the cracking zone where the hydrocarbon feedstock is cracked and a regeneration zone where the coke formed on the catalyst in the cracking zone is burned off. The combustion gases formed in the regeneration zone will usually contain some noxious gases which are considered air pollutants. For example, carbon monoxide is generally formed during oxidation of the coke. See U.S. Pat. No. 3,909,392. In addition, when the hydrocarbon feedstocks contain sulfur and/or nitrogen, the combustion gases will usually contain the oxides of these elements in various amounts.

The carbon monoxide present in the combustion gas may be controlled by adding small amounts of a carbon monoxide oxidation promoter, such as platinum. See U.S. Pat. No. 4,072,600. The sulfur oxides may be controlled by including a sulfur sorbent, such as alumina, in the circulating inventory, i.e., in admixture with the cracking catalyst. See U.S. Pat. No. 4,071,436. It has also been found that inclusion of a sulfur dioxide oxidation promoter enhances the removal of the sulfur from the combustion gas by the sulfur sorbent. See U.S. Pat. No. 4,115,250. Hitherto, one of the most effective sulfur dioxide oxidation promoters was platinum. Although effective, this promoter has the disadvantage of increasing the amount of the oxides of nitrogen present in the flue gas. As noted above, platinum can also serve as a carbon monoxide oxidation promoter. It would be desirable to use an oxidation promoter in the regeneration process which retains the effectiveness of platinum in promoting the oxidation of carbon monoxide and sulfur dioxide without contributing to the formation of nitrogen oxides.

SUMMARY OF THE INVENTION

It has been found that certain mixtures of metals containing palladium and at least one other metal selected from the group consisting of platinum, osmium, iridium, rhodium, and rhenium can serve as an effective carbon monoxide and sulfur dioxide oxidation promoter while minimizing the formation of the oxides of nitrogen. Even more surprising is the discovery that the effectiveness of these mixtures in promoting the oxidation of sulfur dioxide is usually greater than the effectiveness of the individual metals used in forming the mixture. Just as remarkable is the discovery that this increase in the ability to promote the oxidation of sulfur dioxide is usually accompanied by significant decreases in the amount of the oxides of nitrogen formed as compared with platinum alone.

Therefore, the present invention is directed to an improved fluid catalytic cracking process wherein a circulating inventory including a particulate cracking catalyst is cycled between a hydrocarbon cracking zone and a catalyst regeneration zone and wherein the sulfur content of the gases leaving the regeneration zone are controlled by including in the circulating inventory a sulfur oxide sorbent, the improvement comprising having present in the regeneration zone in association with an inorganic oxide support a sulfur dioxide oxidation promoter formed by the intimate association of palladium or a compound of palladium with at least one other metal or a compound thereof selected from the group consisting of platinum, osmium, iridium, rhenium, and rhodium.

The present invention is further directed to a composition of matter useful for cracking a sulfur-containing hydrocarbon in the absence of added hydrogen which comprises:

(a) a particulate cracking catalyst for cracking hydrocarbons in the absence of hydrogen;
(b) a first particulate solid other than said particulate cracking catalyst comprising a sulfur sorbent being capable of sorbing sulfur trioxide; and
(c) a second particulate solid other than said particulate cracking catalyst comprising an inorganic oxide support associated with a metal mixture containing palladium or a compound of palladium and at least one other metal or a compound thereof selected from the group consisting of platinum, osmium, iridium, rhenium, and rhodium.

The present invention is further directed to a composition of matter useful for cracking a sulfur-containing hydrocarbon in the absence of added hydrogen which comprises:

(a) a particulate cracking catalyst consisting essentially of a silica-containing cracking catalyst impregnated with an aluminum compound capable of sorbing sulfur oxides; and
(b) a second particulate solid other than said particulate cracking catalyst comprising an inorganic oxide support associated with a metal mixture containing palladium or a compound of palladium and at least one other metal or a compound thereof selected from the group consisting of platinum, osmium, iridium, rhenium, and rhodium.

The phrase "circulating inventory" refers to the particulate solids which are cycled between the cracking zone and regeneration zone. Thus, the phrase includes, but is not necessarily limited to, the cracking catalyst, the particulate sulfur sorbent, and the promoter particles.

As used herein, the phrase "sulfur sorbent" refers to a material capable of forming a stable association with sulfur trioxide in the regenerator of an FCC unit and capable of dissociation in the hydrocarbon cracking zone. This association may be formed by absorption, adsorption, or by chemical reaction. Such sulfur sorbents include alumina and magnesia. Particularly preferred as a sulfur sorbent is "reactive alumina" which may be described as alumina having a surface area of at least 50 m²/g, e.g., gamma- or eta-alumina. Suitable reactive alumina is not in intimate combination with more than about 40% silica, and preferably is substantially free from admixture with silica. A full description of reactive alumina may be found in U.S. Pat. No. 4,071,436, the text of which is herein incorporated by reference.

BRIEF DESCRIPTION OF THE DRAWING

FIG. 1 compares the ability of various metals and combinations of metals to promote the oxidation of sulfur dioxide and the formation of the oxides of nitrogen.

FIG. 2 demonstrates in graphic form the synergistic effect of various mixtures of palladium/platinum on the oxidation of sulfur dioxide.

DETAILED DESCRIPTION OF THE INVENTION

The present invention is directed to an improved class of oxidation promoters which are highly effective in converting sulfur dioxide to sulfur trioxide. In most cases, the oxidation promoter also may serve as an oxidation promoter for the conversion of carbon monoxide to carbon dioxide. This class of promoters is particularly advantageous because the promoters described herein may be made selective for the promotion of sulfur dioxide to sulfur trioxide while minimizing the formation of the oxides of nitrogen. The relative ratio of palladium to the other metals will vary depending on the metals used and the selected mode of operation. In general, when only one other metal is present in association with the palladium, the relative weight ratios of the two metals will be in the range of from about 100:1 and 1:100, with weight ratios in the range of from about 10:1 and 1:10 being preferred. Particularly preferred for promoting the oxidation of sulfur dioxide are promoters containing palladium and iridium (10:1); and palladium and platinum (10:1). It is important that the metals be placed on the support as a mixture of metals. It has been found that when the different metals are placed on separate particles from one another, the ability of the metals to promote sulfur dioxide oxidation is significantly reduced.

The support used in association with the promoter may be any inorganic oxide which does not adversely affect the activity of the promoter or the operation of the FCC unit. Preferably, the support is a particulate solid which may be physically admixed and circulated with the cracking catalyst and sulfur sorbent. Such materials include porous inorganic oxides, such as alumina and silica, or mixtures of two or more inorganic oxides, such as silica-alumina, natural and synthetic clays and the like, crystalline aluminosilicate zeolites, etc. A preferred support is a porous cracking catalyst which shows good attrition-resistance in the FCC unit to prevent loss of the promoter from the system. The catalyst base HEZ-55 supplied by Engelhard is suitable for use as a support for the promoter.

The metals may be added to the support in any suitable manner, as by impregnation or ion exchange, or can be added to a precursor of a preselected solid support, as by coprecipitation from an aqueous solution with an inorganic oxide precursor. In the case of a particulate promoter-support, the particulate solid can be formed into particles of a size suitable for use in an FCC system by conventional means, such as spray-drying, crushing of larger particles to the desired size, etc.

When incorporating the promoter into the circulating inventory of the FCC unit, sufficient promoter should be present to promote the oxidation of sulfur dioxide to sulfur trioxide. In addition, if it is desired that the oxidation promoter also serve as a promoter for the conversion of carbon monoxide to carbon dioxide, sufficient promoter should be present to aid this reaction. Generally, the amount of promoter required to oxidize the carbon monoxide is less than that required to oxidize the sulfur dioxide, so this is not normally a consideration. In general, the total metal content of the promoter will constitute from about 0.01 to about 2% by weight of the promoter-support association and from about 0.01 to about 100 parts per million by weight of the total circulating inventory.

The sulfur sorbent included in the circulating inventory is preferably reactive alumina. However, other sulfur sorbents have been described and could be used with the present invention. In general, a suitable sulfur sorbent should be capable of sorbing at least about 50 weight percent of the sulfur oxides present in the regeneration zone. In the case of reactive alumina, the particles of sulfur sorbent will usually contain at least 60% by weight of alumina. The alumina will have a surface area of at least 50 square meters per gram and contain from about 0.1 to 100% by weight reactive alumina. The sulfur sorbent will usually be in sufficient amount with the catalyst to provide from about 0.1 to about 25% by weight of alumina with respect to the total circulating inventory. Generally, the sulfur sorbent is included as a particulate solid physically admixed with the catalyst particles and the promoter particles. However, the sulfur sorbent may also be present on the catalyst particles as described in U.S. Pat. No. 4,115,249.

The catalyst employed in cracking the hydrocarbon feedstock may be any catalyst suitable for use in an FCC system. Such catalysts normally contain silica and/or alumina. Other refractory metal oxides, such as magnesia and zirconia, have been suggested and could be employed if desired. Various types of naturally occurring and synthetic aluminosilicate molecular sieves are usually incorporated into the cracking catalyst. The choice of catalyst is not critical to the invention. It is anticipated that the selection of catalyst will depend on the feedstock to be cracked and the mode of operation rather than on the oxidation promoter selected. Thus, catalyst selection is well within the knowledge of one skilled in the art and should require no further explanation here.

Various other types of materials may be included in the circulating inventory of the FCC unit provided they do not interfere substantially with the activity of the metal promoters. Additional carbon monoxide oxidation promoters can be added such as copper or chromium. Sodium has also been employed in association with alumina in the sulfur sorbent. Moderate amounts of such materials are not detrimental to the operation of the invention.

In controlling the formation of nitrogen oxides, oxidation promoters containing a mixture of palladium and iridium (10:1) and of palladium and rhodium (10:1) are especially desirable. Particularly preferred is the mixture of palladium and iridium (10:1) which has also demonstrated excellent promotion of sulfur dioxide to sulfur trioxide.

In order to further clarify the invention described herein, attention is directed to the Table. Various oxidation promoters were placed on equilibrium catalyst HEZ-55 by impregnation, and the ability of the individual metals to oxidize sulfur dioxide to sulfur trioxide was determined indirectly by measuring the rate of sulfur trioxide adsorption onto alumina. The Table shows the activity of three selected metal catalysts when employed alone.

TABLE

| Metal Promoter | Rate of SO₃ Adsorption (ppm/min) |
| --- | --- |
| 0.1% platinum | 599 |
| 0.1% palladium | 497 |
| 0.1% iridium | 318 |

From the Table, it should be noted that platinum is by far the best oxidation promoter of the three metals. Iridium shows very low ability to promote oxidation.

As already noted, the ability of metal mixtures as described herein to promote the oxidation of sulfur dioxide selectively while minimizing the formation of the oxides of nitrogen offers a distinct advantage over oxidation promoters described in the prior art. This is clearly illustrated by referring to FIG. 1 which illustrates the activity of the individual metals shown in the Table and various mixtures of metals falling within the scope of the invention. FIG. 1 shows that all of the mixtures of metals tested had improved activity as sulfur dioxide promoters as compared to the individual metals used to prepare the mixture. At the same time, it is also shown that the metal mixtures significantly reduced the amount of nitrogen oxides formed as compared to platinum when used alone. All data collected used 0.1% total metal by weight on the support.

Particularly active as sulfur dioxide oxidation promoters are mixtures of palladium with iridium (10:1) and of palladium with platinum (10:1).

Referring now to FIG. 2, the effect of various ratios of palladium to platinum on sulfur dioxide oxidation promotion are compared. It will be seen from the Figure that the various mixtures of platinum and palladium show a true synergistic effect, i.e., the mixture shows greater oxidation promotion than either of the metals used alone. Although the greatest oxidation promotion is achieved at about a 1:1 ratio of palladium to platinum, it is usually desirable from an economic standpoint to operate with less platinum in the mixture than the optimum. This is due to the high cost of platinum as compared to palladium.

What is claimed is:

1. An improved fluid catalytic cracking process wherein a circulating inventory including a particulate cracking catalyst is cycled between a hydrocarbon cracking zone and a catalyst regeneration zone and wherein the sulfur content of the gases leaving the regeneration zone is controlled by including in the circulating inventory a sulfur oxide sorbent, the improvement comprising having present in the regeneration zone on an inorganic oxide support a sulfur dioxide oxidation promoter formed by the intimate association of palladium or a compound of palladium with at least one other metal or a compound thereof selected from the group consisting of platinum and iridium, with the proviso that when the other metal is platinum that palladium comprises at least 50% of the associated metals by weight.

2. The process of claim 1 wherein the sulfur oxide sorbent consists of separate particles physically admixed with the cracking catalyst.

3. The process of claim 1 wherein the sulfur dioxide oxidation promoter also serves as a carbon monoxide oxidation promoter.

4. The process of claim 1 wherein the inorganic oxide support is a particulate solid capable of admixture with the circulating inventory and is cycled between the cracking zone and the regeneration zone.

5. The process of claim 1 wherein the sulfur dioxide promoter is an intimate association of palladium or a compound of palladium and one other metal or the compound of one other metal selected from the group consisting of platinum and iridium.

6. The process of claim 5 wherein the other metal is platinum.

7. The process of claim 5 wherein the other metal is iridium.

8. The process of claims 6 or 7 wherein the metals are present in a ratio to one another within the range of from about 10 to 1 and about 1 to 10 by weight percent.

9. The process of claim 4 wherein the total metal content of the promoter is in the range of from about 0.01 to about 2% by weight and constitutes from about 0.01 to about 100 parts per million by weight of the cracking catalyst.

10. The process of claim 4 wherein the support is an attrition-resistant, porous, amorphous, cracking catalyst.

* * * * *